United States Patent
Gong et al.

(10) Patent No.: US 12,276,888 B2
(45) Date of Patent: Apr. 15, 2025

(54) DISPLAY PANEL AND DISPLAY TERMINAL

(71) Applicant: Wuhan China Star Optoelectronics Technology Co., Ltd., Wuhan (CN)

(72) Inventors: Fan Gong, Wuhan (CN); Guanghui Liu, Wuhan (CN); Fei Ai, Wuhan (CN); Jiyue Song, Wuhan (CN); Dewei Song, Wuhan (CN); Rui He, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/776,384

(22) PCT Filed: Apr. 13, 2022

(86) PCT No.: PCT/CN2022/086553
§ 371 (c)(1),
(2) Date: Sep. 21, 2023

(87) PCT Pub. No.: WO2023/173519
PCT Pub. Date: Sep. 21, 2023

(65) Prior Publication Data
US 2024/0152010 A1 May 9, 2024

(30) Foreign Application Priority Data
Mar. 16, 2022 (CN) .......................... 202210259881.3

(51) Int. Cl.
*G02F 1/1362* (2006.01)
*G02F 1/1335* (2006.01)
(Continued)

(52) U.S. Cl.
CPC .. *G02F 1/136209* (2013.01); *G02F 1/136222* (2021.01); *G02F 1/1368* (2013.01); *G02F 1/133514* (2013.01); *G02F 1/1351* (2021.01)

(58) Field of Classification Search
CPC ......... G02F 1/136209; G02F 1/136222; G02F 1/1368
See application file for complete search history.

(56) References Cited

U.S. PATENT DOCUMENTS

2014/0284605 A1 9/2014 Tang et al.
2016/0282989 A1* 9/2016 Hirakata ............... G06F 3/0446

FOREIGN PATENT DOCUMENTS

CN 101762899 A 6/2010
CN 102564581 A 7/2012
(Continued)

OTHER PUBLICATIONS

International Search Report in International application No. PCT/CN2022/086553, mailed on Jun. 28, 2022.
(Continued)

*Primary Examiner* — Lucy P Chien
(74) *Attorney, Agent, or Firm* — Nathan & Associates; Menachem Nathan (57) ABSTRACT

Embodiments of the present disclosure provide a display panel and a display terminal. The display panel includes at least one ultraviolet sensing transistor and at least one control transistor disposed on a substrate, and a color film substrate including a light blocking unit; wherein the ultraviolet sensing transistor includes an ultraviolet absorbing layer, and an orthographic projection of the light blocking unit on the substrate covers an orthographic projection of the ultraviolet absorbing layer on the substrate. According to the embodiment of the present disclosure, the light blocking unit absorbs or blocks the visible lights to prevent the visible lights from entering into the ultraviolet absorbing layer.

14 Claims, 7 Drawing Sheets

(51) Int. Cl.
G02F 1/135 (2006.01)
G02F 1/1368 (2006.01)

(56) References Cited

FOREIGN PATENT DOCUMENTS

| | | |
|---|---|---|
| CN | 102891150 A | 1/2013 |
| CN | 104393024 A | 3/2015 |
| CN | 104952881 A | 9/2015 |
| CN | 105047674 A | 11/2015 |
| CN | 105446000 A | 3/2016 |
| CN | 107219676 A | 9/2017 |
| CN | 111123573 A | 5/2020 |
| CN | 112582438 A | 3/2021 |
| CN | 113629069 A | 11/2021 |

OTHER PUBLICATIONS

Written Opinion of the International Search Authority in International application No. PCT/CN2022/086553, mailed on Jun. 28, 2022.
Chinese Office Action issued in corresponding Chinese Patent Application No. 202210259881.3 dated May 15, 2023, pp. 1-7.

* cited by examiner

DISPLAY PANEL AND DISPLAY TERMINAL

TECHNICAL FIELD

The present disclosure relates to a technical field of display technology, and in particular, to a display panel and a display terminal.

BACKGROUND

With the development of display technology, display panels have been widely used in people's lives, such as display screens of mobile phones, computers, and the like. With the progress of life and the development of technology, in addition to the display performance of the display panel, rich functions and man-machine interaction with a high-quality experience are also required. As a result, panel manufacturers need to enhance the competitiveness on the display panel. For example, people pay more and more attention to an influence of ultraviolet radiation on human health, and the display panel is desired to detect an intensity of ultraviolet radiation through an ultraviolet sensor, so that people can take measures to protect themselves, including warning the time of going out and controlling the time spent in the special working environment, to reduce the damage of ultraviolet radiation on the skin and eyes of people, and enhance the health of people.

However, it is currently required to prepare the ultraviolet sensor separately, when the ultraviolet sensor is provided at the outside of the display panel. There are disadvantages over the display panel with the ultraviolet sensor provided outside such that the structure of the display panel is complex, the process for manufacturing the display panel is numerous, and it is not conductive to the light and thin performance of the display panel. Meanwhile, there are also problems where the visible lights enter into the ultraviolet sensor, so that the ultraviolet sensor cannot accurately monitor the intensity of the ultraviolet lights.

Technical Problems

Embodiments of the present disclosure provide a display panel and a display terminal, which can solve the problems that a conventional display panel with a ultraviolet light monitoring function has a complex structure, requires a variety of processes, and is not thin enough, and that the visible lights enter into the ultraviolet sensor, so that the ultraviolet sensor cannot accurately monitor the intensity of the ultraviolet lights.

SUMMARY

Embodiments of the present disclosure provide a display panel including:
- an array substrate, wherein the array substrate comprises a substrate, and at least one ultraviolet sensing transistor and at least one control transistor disposed on the substrate; the control transistor is electrically connected with the ultraviolet sensing transistor; and the ultraviolet sensing transistor comprises an ultraviolet absorbing layer;
- a color film substrate disposed on an opposite side of the array substrate, wherein the color film substrate comprises a light blocking unit;
- wherein an orthographic projection of the light blocking unit on the substrate covers an orthographic projection of the ultraviolet absorbing layer on the substrate.

Optionally, in some embodiments of the present disclosure, the color film substrate further comprises a first color resistance, a second color resistance, and a third color resistance; wherein the light blocking unit comprises one of the first color resistance, the second color resistance, and the third color resistance; or comprises at least two of the first color resistance, the second color resistance, and the third color resistance which are stacked.

Optionally, in some embodiments of the present disclosure, the color film substrate further includes a light shielding layer, wherein an orthographic projection of the light shielding layer on the substrate covers an orthographic projection of a semiconductor layer of the control transistor on the substrate.

Optionally, in some embodiments of the present disclosure, the display panel further comprises a first organic layer between the light blocking unit and the ultraviolet absorbing layer, and the first organic layer comprises a first opening, wherein an orthographic projection of the first opening on the substrate at least partially overlaps the orthographic projection of the ultraviolet absorbing layer on the substrate.

Optionally, in some embodiments of the present disclosure, the display panel further comprises a first organic layer between the light blocking unit and the ultraviolet absorbing layer, and the first organic layer comprises a first opening, wherein an orthographic projection of the first opening on the substrate at least partially overlaps the orthographic projection of the ultraviolet absorbing layer on the substrate.

Optionally, in some embodiments of the present disclosure, the display panel further comprises a first organic layer between the light blocking unit and the ultraviolet absorbing layer, and the first organic layer comprises a first opening, wherein an orthographic projection of the first opening on the substrate at least partially overlaps the orthographic projection of the ultraviolet absorbing layer on the substrate.

Optionally, in some embodiments of the present disclosure, the display panel comprises a non-display area and a display area, and the ultraviolet sensing transistor and the control transistor are disposed in the non-display area;
wherein the display panel further includes a blocking layer disposed between the ultraviolet sensing transistor and the substrate, and an orthographic projection of the blocking layer on the substrate covers the orthographic projection of the ultraviolet absorbing layer on the substrate.

Optionally, in some embodiments of the present disclosure, the display panel comprises a non-display area and a display area, and the ultraviolet sensing transistor and the control transistor are disposed in the non-display area;
wherein the display panel further includes a blocking layer disposed between the ultraviolet sensing transistor and the substrate, and an orthographic projection of the blocking layer on the substrate covers the orthographic projection of the ultraviolet absorbing layer on the substrate.

Optionally, in some embodiments of the present disclosure, the display panel comprises a non-display area and a display area, and the ultraviolet sensing transistor and the control transistor are disposed in the non-display area;
wherein the display panel further includes a blocking layer disposed between the ultraviolet sensing transistor and the substrate, and an orthographic projection of the blocking layer on the substrate covers the orthographic projection of the ultraviolet absorbing layer on the substrate.

Optionally, in some embodiments of the present disclosure, the ultraviolet sensing transistor comprises a first gate, a first source, and a first drain; and the control transistor comprises a second gate, a second source, and a second drain;

wherein the first gate and the second gate are located in a same layer; the first source, the first drain, the second source and the second drain are located in a same layer; and the ultraviolet absorbing layer of the ultraviolet sensing transistor and a semiconductor layer of the control transistor are located in a same layer.

Optionally, in some embodiments of the present disclosure, the display panel further comprises a gate driving circuit disposed in the non-display area; the gate driving circuit comprises a plurality of gate driving transistors; and each of the plurality of gate driving transistors comprises a third gate, a third source, a third drain, and an active layer;

wherein the first gate and the third gate are located in a same layer; the first source, the first drain, the third source and the third drain are located in a same layer; and the ultraviolet absorbing layer of the ultraviolet sensing transistor and the active layer of the gate driving transistor are located in a same layer.

Optionally, in some embodiments of the present disclosure, the ultraviolet absorbing layer of the ultraviolet sensing transistor, the semiconductor layer of the control transistor, and the active layer of the gate driving transistor are made of polysilicon.

Optionally, in some embodiments of the present disclosure, an area of the ultraviolet absorbing layer of the ultraviolet sensing transistor is larger than an area of the semiconductor layer of the control transistor.

Optionally, in some embodiments of the present disclosure, the ultraviolet absorbing layer of the ultraviolet sensing transistor has a channel width ranging from 200 µm to 5000 µm, and a channel length ranging from 3 µm to 6 µm;

wherein the semiconductor layer of the control transistor has a channel width ranging from 3 µm to 20 µm, and a channel length ranging from 3 µm to 6 µm.

Accordingly, embodiments of the present disclosure further provide a display terminal; wherein the display terminal includes a terminal body and a display panel; the terminal body and the display panel are integrated; and the display panel includes:

an array substrate, wherein the array substrate comprises a substrate, and at least one ultraviolet sensing transistor and at least one control transistor disposed on the substrate; the control transistor is electrically connected with the ultraviolet sensing transistor; and the ultraviolet sensing transistor comprises an ultraviolet absorbing layer;

a color film substrate disposed on an opposite side of the array substrate, wherein the color film substrate comprises a light blocking unit;

wherein an orthographic projection of the light blocking unit on the substrate covers an orthographic projection of the ultraviolet absorbing layer on the substrate.

Optionally, in some embodiments of the present disclosure, the color film substrate further comprises a first color resistance, a second color resistance, and a third color resistance; wherein the light blocking unit comprises one of the first color resistance, the second color resistance, and the third color resistance; or comprises at least two of the first color resistance, the second color resistance, and the third color resistance which are stacked.

Optionally, in some embodiments of the present disclosure, the color film substrate further comprises a light shielding layer, wherein an orthographic projection of the light shielding layer on the substrate covers an orthographic projection of a semiconductor layer of the control transistor on the substrate.

Optionally, in some embodiments of the present disclosure, the display panel further comprises a first organic layer between the light blocking unit and the ultraviolet absorbing layer, and the first organic layer comprises a first opening, wherein an orthographic projection of the first opening on the substrate at least partially overlaps the orthographic projection of the ultraviolet absorbing layer on the substrate.

Optionally, in some embodiments of the present disclosure, the display panel comprises a non-display area and a display area, and the ultraviolet sensing transistor and the control transistor are disposed in the non-display area;

wherein the display panel further includes a blocking layer disposed between the ultraviolet sensing transistor and the substrate, and an orthographic projection of the blocking layer on the substrate covers the orthographic projection of the ultraviolet absorbing layer on the substrate.

Optionally, in some embodiments of the present disclosure, the ultraviolet sensing transistor comprises a first gate, a first source, and a first drain; and the control transistor comprises a second gate, a second source, and a second drain;

wherein the first gate and the second gate are located in a same layer; the first source, the first drain, the second source and the second drain are located in a same layer; and the ultraviolet absorbing layer of the ultraviolet sensing transistor and a semiconductor layer of the control transistor are located in a same layer.

Beneficial Effects

In an embodiment of the present disclosure, a display panel and a display terminal are provided. The display panel includes an array substrate and a color film substrate disposed on an opposite side of the array substrate. The array substrate includes a substrate, and at least one ultraviolet sensing transistor and at least one control transistor disposed on the substrate. The control transistor is electrically connected with the ultraviolet sensing transistor, and the ultraviolet sensing transistor includes an ultraviolet absorbing layer. The color film substrate includes a light blocking unit, wherein an orthographic projection of the light blocking unit on the substrate covers an orthographic projection of the ultraviolet absorbing layer on the substrate. In the display panel according to the embodiment of the present disclosure, the ultraviolet sensing transistor and the control transistor are integrated on the array substrate, so that the display panel with the ultraviolet light monitoring function has the advantages of simpler structure, simpler process, and lighter and thinner. Meanwhile, the visible lights are absorbed or blocked by the light blocking unit, thereby preventing the visible lights from entering into the ultraviolet absorbing layer to avoid interference, thereby improving the precision of the ultraviolet sensing transistor on monitoring the ultraviolet light.

BRIEF DESCRIPTION OF THE DRAWINGS

In order to more clearly describe the technical solutions in the embodiments of the present disclosure, the accompanying drawings required in the description of the embodiments will be briefly described below. It is obvious that the accompanying drawings in the following description are merely some embodiments of the present disclosure, and other drawings may be obtained by those skilled in the art without creative efforts.

DETAILED DESCRIPTION OF THE EMBODIMENTS

The technical solutions in the embodiments of the present disclosure will now be clearly and completely described in conjunction with the accompanying drawings. It is apparent that the described embodiments are only some but not all of the embodiments of the present disclosure. Based on the embodiments of the present disclosure, all other embodiments obtained by those skilled in the art without creative efforts are within the scope of the present disclosure. Furthermore, it should be understood that the specific embodiments described herein are merely intended to illustrate and explain the present disclosure, and are not intended to limit the present disclosure. In the present disclosure, unless otherwise stated, the terms for describing the location such as "up" and "down" generally refer to the up and down direction of the device in actual use or in working state, specifically refer to the up and down direction of the accompanying drawings; and the terms "in" and "out" refer to the profile of the device.

The present disclosure provides a display panel, wherein the display panel includes an array substrate and a color film substrate disposed on an opposite side of the array substrate. The array substrate includes a substrate, and at least one ultraviolet sensing transistor and at least one control transistor disposed on the substrate. The control transistor is electrically connected with the ultraviolet sensing transistor, and the ultraviolet sensing transistor includes an ultraviolet absorbing layer. The color film substrate includes a light blocking unit, wherein an orthographic projection of the light blocking unit on the substrate covers an orthographic projection of the ultraviolet absorbing layer on the substrate. The present disclosure also provides a display terminal and a manufacturing method for the display panel as described above. The following is a detailed description. It should be noted that the order of description of the following embodiments is not a limitation on the preferred order of the embodiments.

Embodiment 1

Figure 1:
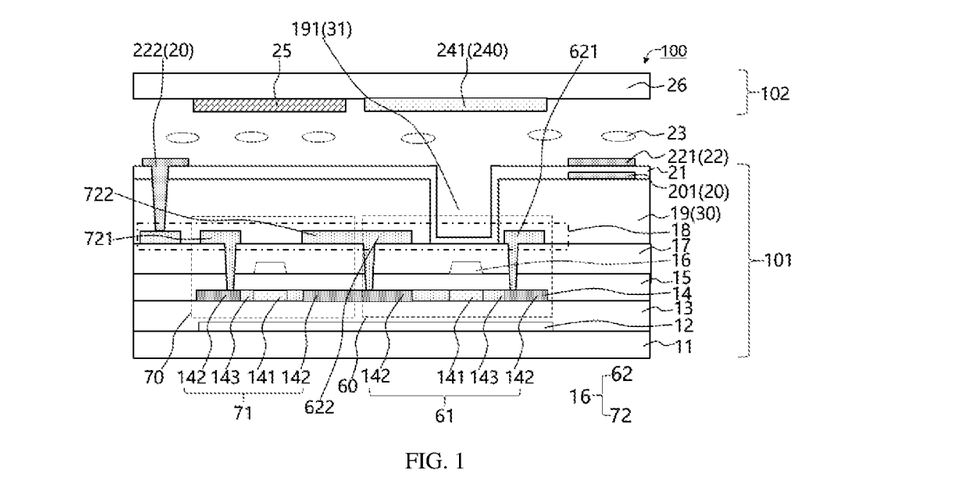
FIG. 1 is a schematic diagram of a first cross-sectional structure of a display panel according to an embodiment of the present disclosure.
Figure 2:
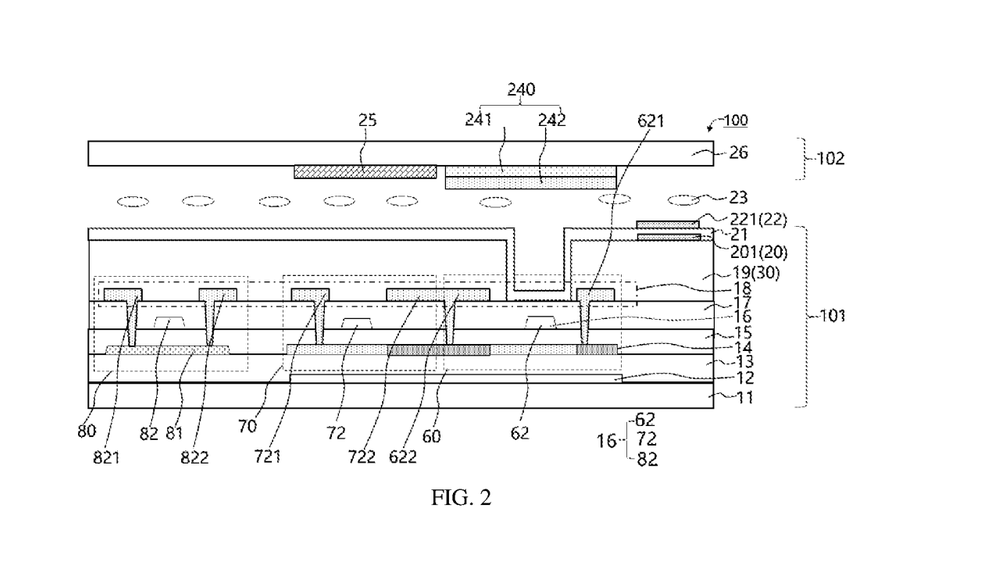
FIG. 2 is a schematic diagram of a second cross-sectional structure of a display panel according to an embodiment of the present disclosure.
Figure 3:
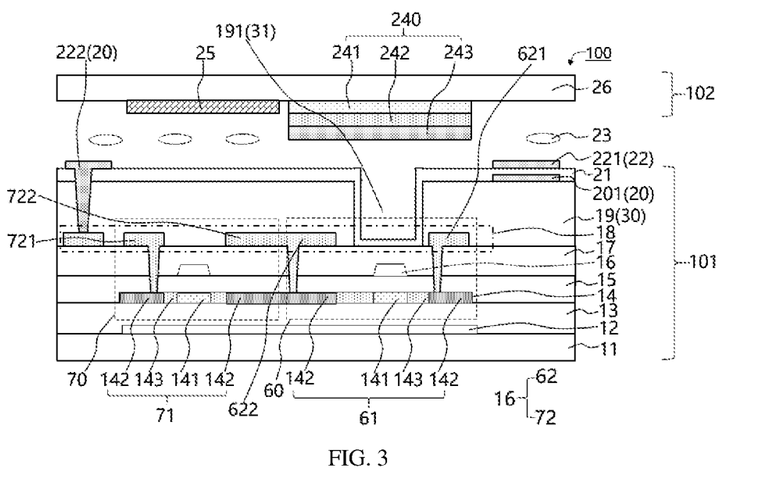
FIG. 3 is a schematic diagram of a third cross-sectional structure of a display panel according to an embodiment of the present disclosure.
Figure 4:
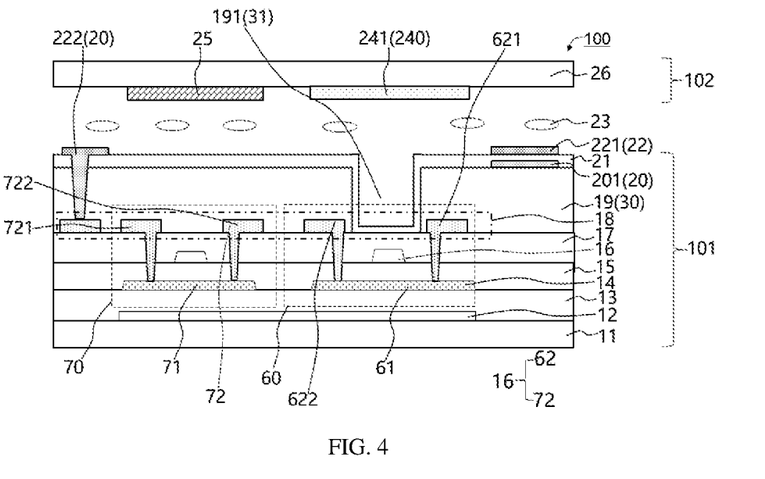
FIG. 4 is a schematic diagram of a fourth cross-sectional structure of a display panel according to an embodiment of the present disclosure.
Figure 5:
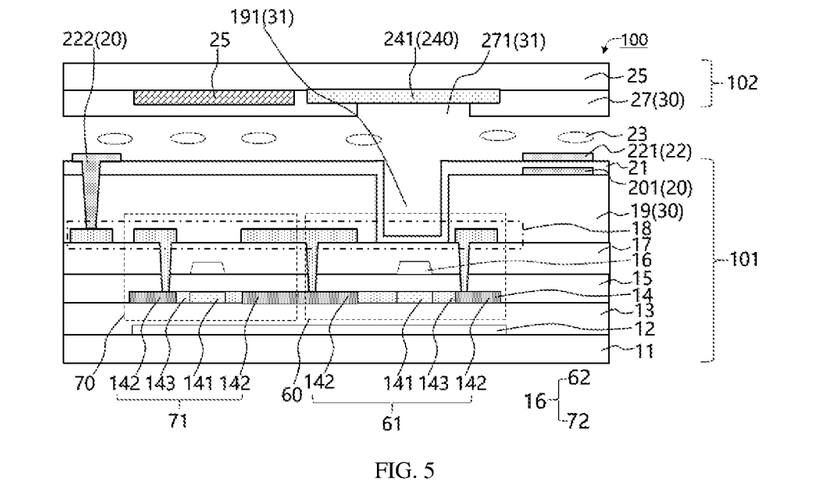
FIG. 5 is a schematic diagram of a fifth cross-sectional structure of a display panel according to an embodiment of the present disclosure.

References are made to FIG. 1 to FIG. 5, wherein FIG. 1 is a schematic diagram of a first cross-sectional structure of a display panel 100 according to an embodiment of the present disclosure, FIG. 2 is a schematic diagram of a second cross-sectional structure of a display panel 100 according to an embodiment of the present disclosure, FIG. 3 is a schematic diagram of a third cross-sectional structure of a display panel 100 according to an embodiment of the present disclosure, FIG. 4 is a schematic diagram of a fourth cross-sectional structure of a display panel 100 according to an embodiment of the present disclosure, and FIG. 5 is a schematic diagram of a fifth cross-sectional structure of a display panel 100 according to an embodiment of the present disclosure. FIG. 1 and FIG. 2 are identical or similar, except that the structures of the light blocking units 240 in FIG. 1 and FIG. 2 are different, and a structure of the gate driving transistor 80 is also shown in FIG. 2.

An embodiment of the present disclosure provides a display panel 100. The display panel 100 includes an array substrate 101 and a color film substrate 102. The array substrate 101 includes a substrate 11, and at least one ultraviolet sensing transistor 60 and at least one control transistor 70 disposed on the substrate 11. The control transistor 70 is electrically connected with the ultraviolet sensing transistor 60, and the ultraviolet sensing transistor 60 includes an ultraviolet absorbing layer 61. The color film substrate 102 is disposed on an opposite side of the array substrate 101, and includes a light blocking unit 240. An orthographic projection of the light blocking unit 240 on the substrate 11 covers an orthographic projection of the ultraviolet absorbing layer 61 on the substrate 11.

Specifically, an ultraviolet sensor includes at least one ultraviolet sensing transistor 60 (as shown by the dashed line box in FIG. 1) and at least one control transistor 70 (as shown by the dashed line box in FIG. 1). The ultraviolet sensing transistor 60 and the control transistor 70 of the ultraviolet sensor are integrated in the array substrate 101, so that the display panel with the ultraviolet light monitoring function has the advantages of simpler structure, simpler process, and lighter and thinner.

Specifically, the color film substrate 102 is disposed on the opposite side of the array substrate 101, and includes a light blocking unit 240. The orthographic projection of the light blocking unit 240 on the substrate 11 covers the orthographic projection of the ultraviolet absorbing layer 61 on the substrate 11. By providing the light blocking unit 240 to absorb or block the visible lights, the visible lights are prevented from entering into the ultraviolet absorbing layer 61 to avoid interference, so that the precision on monitoring the ultraviolet light by the ultraviolet sensing transistor 60 can be improved.

Specifically, the display panel 100 further includes a liquid crystal layer 23 disposed between the array substrate 101 and the color film substrate 102.

Specifically, when the ultraviolet sensing transistor 60 is operated, the visible lights irradiate to the ultraviolet absorbing layer 61, which also causes a certain current or charge transfer in the ultraviolet absorbing layer 61, thereby reducing the precision on monitoring the ultraviolet light. The light blocking unit 240 can absorb the visible lights by providing the orthographic projection of the light blocking unit 240 on the substrate 11 at least partially overlaps the orthographic projection of the ultraviolet absorbing layer 61 on the substrate 11, or the orthographic projection of the light blocking unit 240 on the substrate 11 covers the orthographic projection of the ultraviolet absorbing layer 61 on the substrate 11, thereby improving the precision on monitoring the ultraviolet light by the ultraviolet sensing transistor 60.

It should be noted that the display panel 100 may include an ultraviolet sensor including a control transistor 70, an ultraviolet sensing transistor 60, and a storage capacitor. The storage capacitor includes a first capacitance electrode plate and a second capacitance electrode plate. The first capacitance electrode plate is electrically connected with a second drain 722 of the control transistor 70. Alternatively, the first capacitance electrode plat is electrically connected with a first source 621 or a first drain 622 of the ultraviolet sensing transistor 60 electrically connected with the second drain 722 of the control transistor 70. Alternatively, the first capacitance electrode plate is the second drain 722 of the control transistor 70 or the first source 621 of the ultraviolet sensing transistor 60 (or the first capacitance electrode plate is the second drain 722 of the control transistor 70 or the first drain 622 of the ultraviolet sensing transistor 60). The control transistor 70 can control an electrical signal transmitting a first capacitance electrode. When the ultraviolet sensing transistor 60 is operated, the control transistor 70 can close and stop transmitting the electrical signal to the first capacitance electrode, so that the charges stored in the storage capacitor remain stable. However, when the ultraviolet lights irradiate to the ultraviolet absorbing layer 61, an electric charge or a current is generated in the ultraviolet absorbing layer 61 of the ultraviolet sensing transistor 60, and an amount of the charges stored in the storage capacitor or an potential of the first capacitance electrode changes. An end of the storage capacitor is electrically connected with an integrated circuit chip, and the integrated circuit chip can detect the amount of the charges or the potential of the storage capacitor in change, so as to determine or display whether there is an ultraviolet light radiation and the intensity of the ultraviolet light radiation. The structure and operation principle of a sensor control circuit and the principle of monitoring the ultraviolet light are briefly described herein, but are not limited thereto. The ultraviolet sensing transistor 60 or/and the control transistor 70 of the embodiment of the present disclosure may be used for any sensor control circuit, and details are not described herein.

In some embodiments, the color film substrate 102 further includes a first color resistor 241, a second color resistor 242, and a third color resistor 243. The light blocking unit 240 includes one of the first color resistor 241, the second color resistor 242, and the third color resistor 243, or at least two of the first color resistor 241, the second color resistor 242, and the third color resistor 243 which are stacked.

Specifically, the first color resistor 241, the second color resistor 242, and the third color resistor 243 may be a red color resistor, a green color resistor, and a blue color resistor, respectively, which are not limited herein.

Specifically, as shown in FIG. 1, the light blocking unit 240 includes one of the first color resistor 241, the second color resistor 242, and the third color resistor 243. Providing the light blocking unit 240 with a color resistor can absorb or block the visible lights having a same color corresponding the color resistor, thereby improving the precision on monitoring the ultraviolet light by the ultraviolet sensing transistor 60.

Specifically, the light blocking unit 240 includes at least two of the first color resistor 241, the second color resistor 242, and the third color resistor 243 in a stacked shape. The color film substrate 102 may include a underlay 26. For example, as shown in FIG. 2, the light blocking unit 240 includes the first color resistor 241 and the second color resistor 242, wherein the first color resistor 241 and the second color resistor 242 are stacked on the underlay 26. For example, as shown in FIG. 3, the light blocking unit 240 includes the first color resistances 241, the second color resistances 242, and the third color resistances 243, wherein the first color resistances 241, second color resistances 242, and third color resistances 243 are stacked on the underlay 26. Providing the light blocking unit 240 including two or more color resistances of different colors which are stacked, absorbs the visible lights of a plurality of colors or all of the visible lights, thereby improving the precision on monitoring the ultraviolet light by the ultraviolet sensing transistor 60. When the first color barrier 241, the second color barrier 242, and the third color barrier 243 are stacked into the light blocking unit 240, the visible lights can be completely absorbed, and the precision on monitoring the ultraviolet light by the ultraviolet sensing transistor can be improved.

In the present embodiment, a display panel 100 in provided, in which the ultraviolet sensing transistor 60 and the control transistor 70 are integrated in the array substrate 101, so that the display panel 100 with the ultraviolet light monitoring function has the advantages of simpler structure, simpler process, and lighter and thinner. Meanwhile, by providing the light blocking unit 240 to absorb or block the visible lights, the visible lights are prevented from entering into the ultraviolet absorbing layer 61 to avoid interference, thereby improving the precision on monitoring the ultraviolet light by the ultraviolet sensing transistor 60.

Embodiment 2

This embodiment is identical or similar to the above embodiment, except that the structure of the display panel 100 is further described.

In some embodiments, the color film substrate 102 further includes a light shielding layer 25, wherein an orthographic projection of the light shielding layer 25 on the substrate 11 covers an orthographic projection of an semiconductor layer 71 of the control transistor 70 on the substrate 11.

Specifically, the performance of the control transistor 70 during the period of turning on and off is affected by the visible lights or the ultraviolet lights irradiating to the semiconductor layer 71 of the control transistor 70. By providing the light shielding layer 25, the lights are prevented from affecting the performance of the control transistor 70, thereby improving the stability and reliability of the sensor control circuit and improving the precision on monitoring the ultraviolet light.

Specifically, the light shielding layer 25 may be a black matrix (BM), and the color film substrate 102 may be any structure of the prior art, which is not limited herein.

In some embodiments, the display panel 100 further includes a first organic layer 30 between the light blocking unit 240 and the ultraviolet absorbing layer 61, wherein the first organic layer 30 includes a first opening 31, and an orthographic projection of the first opening 31 on the substrate 11 at least partially overlaps the orthographic projection of the ultraviolet absorbing layer 61 on the substrate 11.

Specifically, the first organic layer 30 includes the first opening 31 to avoid the ultraviolet lights from being absorbed by the first organic layer 30, thereby improving the transmittance of the ultraviolet lights to the ultraviolet absorbing layer 61, and further increasing sufficient ultraviolet lights to the ultraviolet absorbing layer, thus, improving sensitivity and precision on monitoring the ultraviolet light.

Preferably, the orthographic projection of the first aperture 31 on the substrate 11 covers the orthographic projection of the ultraviolet absorbing layer 61 on the substrate 11, which may better enhance the sensitivity and precision on monitoring the ultraviolet light.

Specifically, in some embodiments, as shown in FIG. 1 to FIG. 4, the first organic layer 30 may be a first flat layer 19 on the array substrate 101, and the first opening 31 may be a first sub-opening 191 in the first flat layer 19.

Specifically, in some embodiments, as shown in FIG. 5, the first organic layer 30 may be a second flat layer 27 on the color film substrate 102, and the first opening 31 may be a second sub-opening 271 in the second flat layer 27.

Specifically, in some embodiments, as shown in FIG. 5, the first organic layer 30 may include both the first flat layer 19 on the array substrate 101 and the second flat layer 27 on the color film substrate 102. The first opening 31 includes the first sub-opening 191 and the second sub-opening 271. Both the orthographic projection of the first sub-opening 191 on the substrate 11 and the orthographic projection of the second sub-opening 271 on the substrate 11 cover the orthographic projection of the ultraviolet absorbing layer 61 on the substrate 11, thereby better avoiding the ultraviolet lights from being absorbing by the first organic layer 30, improving the transmittance of the ultraviolet lights to the ultraviolet absorbing layer 61, and further increasing sufficient ultraviolet light to the ultraviolet absorbing layer 61, thus, improving the precision of the monitoring the ultraviolet light.

Embodiment 3

This embodiment is identical or similar to the above embodiment, except that the structure of the display panel 100 is further described.

Figure 6:
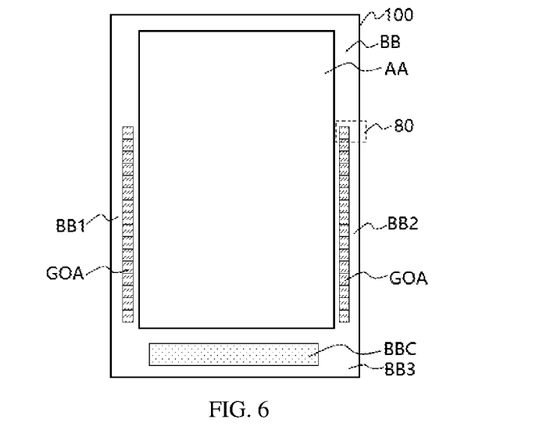
FIG. 6 is a schematic top diagram of a display panel according to an embodiment of the present disclosure.

References are made to FIG. 6, wherein FIG. 6 is a schematic top diagram of a display panel 100 according to an embodiment of the present disclosure.

In some embodiments, the display panel 100 includes a non-display area BB and a display area AA. The ultraviolet sensing transistor 60 and the control transistor 70 are both disposed in the non-display area BB. The display panel 100 further includes a blocking layer 12 disposed between the ultraviolet sensing transistor 60 and the substrate 11, wherein an orthographic projection of the blocking layer 12 on the substrate 11 covers an orthographic projection of the ultraviolet absorbing layer 61 on the substrate 11.

Specifically, as shown in FIG. 6, the non-display area BB includes a first border area BB1, a second border area BB2, and a third border area BB3. The first border area BB1, the second border area BB2, and the third border area BB3 are at least partially disposed around the display area AA, wherein the first border area BB1 and the second border area BB2 are disposed opposite to each other, and the third border area BB3 is located between the first border area BB1 and the second border area BB2.

Specifically, both the ultraviolet sensing transistor 60 and the control transistor 70 are provided in the non-display area BB, and it is possible to avoid the ultraviolet sensing transistor 60 and the control transistor 70 of the ultraviolet sensor from affecting the opening rate of the sub-pixels in the display area AA, so that the image display of the display panel is not affected.

Specifically, as shown in FIG. 5, the blocking layer 12 may shield the lights, and the blocking layer 12 may be a light shielding layer (LS) on the array substrate.

Specifically, the orthographic projection of the blocking layer 12 on the substrate 11 covers the orthographic projection of the ultraviolet absorbing layer 61 on the substrate 11, so that the lights are prevented from being irradiated from a side of the substrate 11 to the ultraviolet absorbing layer 61. As such, the lights, such as the backlights, are prevented from affecting the ultraviolet absorbing layer 61 monitoring the ultraviolet light from the external environment, thereby improving the precision on monitoring the ultraviolet light.

Specifically, further, the orthographic projection of the blocking layer 12 on the substrate 11 covers the orthographic projection of the ultraviolet absorbing layer 61 on the substrate 11, and the orthographic projection of the semiconductor layer 71 of the control transistor 70 on the substrate 11. The blocking layer 12 simultaneously prevents the lights from irradiating from a side of the substrate 11 to the ultraviolet absorbing layer 61 and the semiconductor layer 71, thereby preventing the lights from a side of the substrate 11 from affecting performance of the control transistor 70 during the period of tuning on and off, and preventing the lights from a side of the substrate 11 from affecting the ultraviolet absorbing layer 61. Thus, the stability and reliability of the sensor control circuit and improving the precision on monitoring the ultraviolet light can be improved.

In some embodiments, the ultraviolet sensing transistor includes a first gate 62, a first source 621, and a first drain 622. The control transistor includes a second gate 72, a second source 721, and a second drain 722. The first gate 62 and the second gate 72 are located in a same layer. The first source 621, the first drain 622, the second source 721, and the second drain 722 are located in a same layer. The ultraviolet absorbing layer 61 of the ultraviolet sensing transistor 60 and the semiconductor layer 71 of the control transistor 70 are located in a same layer.

Specifically, referring to FIG. 1 and FIG. 2, the first gate 62 and the second gate 72 are located in a same layer. The first source 621, the first drain 622, the second source 721, and the second drain 722 are located in a same layer. The ultraviolet absorbing layer 61 of the ultraviolet sensing transistor 60 and the semiconductor layer 71 of the control transistor 70 are located in a same layer. That is, the plurality of layer structures of the ultraviolet sensing transistor 60 and the plurality of layer structures of the control transistor 70 may be manufactured in a same process, thereby simplifying the manufacturing processes and reducing the production cost. In addition, the ultraviolet sensor may be manufactured on the devices in the prior art, and the display panel 100 with the ultraviolet sensor according to this embodiment has the advantages of simpler process and lower cost.

Specifically, the first gate 62 and the second gate 72 are located in a same layer. The first source 621, the first drain 622, the second source 721, and the second drain 722 are located in a same layer. The ultraviolet absorbing layer 61 of the ultraviolet sensing transistor 60 and the semiconductor layer 71 of the control transistor 70 are located in a same layer. A gate insulating layer 15 is disposed between the first gate 62 and the ultraviolet absorbing layer 61, and the gate insulating layer 15 is disposed between the second gate 72 and the semiconductor layer 71 of the control transistor 70. An interlayer insulating layer 17 is disposed between the first source 621 and the light absorbing layer 61, between the first source 621 and the semiconductor layer 71 of the control transistor 70, between the first drain 622 and the light absorbing layer 61, between the first drain 622 and the semiconductor layer 71 of the control transistor 70, between the second source 721 and the light absorbing layer 61, between the second source 721 and the semiconductor layer 71 of the control transistor 70, between the second drain 722 and the light absorbing layer 61, and between the second drain 722 and the semiconductor layer 71 of the control transistor 70.

Specifically, the layer structure of the array substrate 101 shown in FIG. 1 to FIG. 5 comprises: a substrate 101, a blocking layer 12, a buffer layer 13, a polysilicon layer 14, a gate insulating layer 15, a gate layer 16, an interlayer insulating layer 17, an source/drain layer 18, a first flat layer 19, a first metal layer 20, a first insulating layer 21, and a second metal layer 22. The gate layer 16 includes a first gate 62 and a second gate 72. The source/drain layer 18 includes a first source 621, a first drain 622, a second source 721, and a second drain 722. The first metal layer 20 may include a common electrode 201. The second metal layer 22 may include a pixel electrode 221. The layer structure of the array substrate 101 may include other structures, for example, the structure with the ultraviolet sensing transistor 60 and the control transistor 70 may be a top gate structure, or may be a bottom gate structure, which is not limited to here.

It should be noted that, in some embodiments, the second drain 722 of the control transistor 70 is electrically connected to the first source 621 or the first drain 622 of the ultraviolet sensing transistor 60. Alternatively, the second drain 722 of the control transistor 70 is a same electrode with the first source 621 or the second drain 622 of the ultraviolet sensing transistor 60. Specifically, the control transistor 70 is configured to control the electrical signal of the first source 621 or the first drain 622 of the ultraviolet sensing transistor 60. As shown in FIG. 1 to FIG. 3, the second drain 722 of the control transistor 70 is a same electrode with the first source 621 or the first drain 622 of the ultraviolet sensing transistor 60, which can reduce the number of electrodes and improve the utilization of the layout space. Specifically, as shown in FIG. 4, the second drain 722 of the control transistor 70 is electrically connected (not shown) to the first source 621 or the first drain 622 of the ultraviolet sensing transistor 60. Further, as shown in FIG. 1, the semiconductor layer 71 of the control transistor 70 and the ultraviolet absorbing layer 61 of the ultraviolet sensing transistor 60 may be integrally connected as a whole, thereby avoiding the ultraviolet absorbing layer of the ultraviolet sensing transistor and the semiconductor layer of the control transistor which are disposed separately from occupying the layout space, and improving the utilization of the layout space.

In some embodiments, the display panel 100 further includes a gate driving circuit GOA disposed in the non-display area BB, wherein the gate driving circuit GOA includes a plurality of gate driving transistors. The gate driving transistor includes a third gate 82, a third source 821, a third drain 822, and an active layer 81. The first gate 62 and the third gate 82 are located in a same layer. The first source 621, the first drain 622, the third source 821, and the third drain 822 are located in a same layer. The ultraviolet absorbing layer 61 of the ultraviolet sensing transistor 60 and the active layer 81 of the gate driving transistor 80 are located in a same layer. Specifically, further, the display panel 100 further includes a gate driving circuit GOA disposed in the non-display area BB, the first gate 62 and the third gate 82 are disposed in a same layer; the first source 621, the first drain 622, the third source 821, and the third drain 822 are disposed in a same layer; and the ultraviolet absorbing layer 61 of the ultraviolet sensing transistor 60 and the active layer 81 of the gate driving transistor 80 are disposed in a same layer. As such, a plurality of film layer structures of the ultraviolet sensing transistor and a plurality of film layer structures of the gate driving transistor can be manufactured in a same process, thereby simplifying the manufacturing processes and reducing the production cost. In addition, the ultraviolet sensor can be manufactured on the devices in the prior art, and the display panel 100 with the ultraviolet sensor according to the present embodiment has the advantages of simpler process and lower cost.

Specifically, further, the first gate 62, the second gate 72, and the third gate 82 are located at a same layer. The first source 621, the first drain 622, the second source 721, the second drain 722, the third source 821, and the third drain 822 are located at a same layer. The ultraviolet absorbing layer 61 of the ultraviolet sensing transistor 60, the semiconductor layer 71 of the control transistor 70, and the active layer 81 of the gate driving transistor 80 are located at a same layer. As such, a plurality of film layer structures of the ultraviolet sensing transistor 60, a plurality of film layer structures of the control transistor 70, and a plurality of film layer structures of the gate driving transistor 80 can be manufactured in a same process, thereby simplifying the manufacturing processes and reducing the production cost. In addition, the ultraviolet sensor can be manufactured on the devices in the prior art, and the display panel 100 with the ultraviolet sensor according to the present embodiment has the advantages of simpler process and lower cost.

It should be noted that the gate driving circuit GOA may be any one of the circuits in the prior art, and the structures of the gate driving circuit GOA and the gate driving transistor are not described herein.

It should be noted that, as shown in FIG. 6, the third border area BB3 is provided with a pad BBC which may be connected to a flexible circuit board (FPC, PCB) and a driving chip (IC). The gate driving circuit GOA is disposed on at least one of the first border area BB1 and the second border area BB2. In some embodiments, the gate driving circuit GOA is disposed on both the first border area BB1 and the second border area BB2. In some embodiments, the ultraviolet sensing transistor 60 and the control transistor 70 are disposed in at least one of the first border area BB1, the second border area BB2, and the third border area BB3. In some preferred embodiments, the ultraviolet sensing transistor 60 and the control transistor 70 are disposed in the first border area BB1 or/and the second border area BB2.

Embodiment 4

This embodiment is identical as or similar to the above embodiment, except that the structure of the display panel 100 is further described.

In some embodiments, materials of the ultraviolet absorbing layer 61 of the ultraviolet sensing transistor 60, the semiconductor layer 71 of the control transistor 70, and the active layer 81 of the gate driving transistor 80 are polysilicon.

Specifically, materials of the ultraviolet absorbing layer 61 of the ultraviolet sensing transistor 60 and the semiconductor layer 71 of the control transistor 70 are polysilicon. The polysilicon is used to the ultraviolet absorbing layer 61, and thus, the ultraviolet absorbing layer 61 may be formed by the polysilicon via a mature process in the field of the display panel. As such, the ultraviolet absorbing layer can be manufactured on the devices in the prior art, which has the advantages of simpler process and lower cost.

Specifically, materials of the ultraviolet absorbing layer 61 of the ultraviolet sensing transistor 60, the semiconductor layer 71 of the control transistor 70, and the active layer 81 of the gate driving transistor 80 are polysilicon. The polysilicon is used to the ultraviolet absorbing layer 61, and thus, the ultraviolet absorbing layer 61 may be formed by the polysilicon via a mature process in the field of the display panel. As such, the ultraviolet absorbing layer can be manufactured on the devices in the prior art, which has the advantages of simpler process and lower cost.

It should be noted that the ultraviolet sensing transistor 60, the control transistor 70, and the gate driving transistor 80 all refer to a thin film transistor. The carriers (electrons or/and holes) are migrating in the ultraviolet absorbing layer 61 of the ultraviolet sensing transistor 60, the semiconductor layer 71 of the control transistor 70, and the active layer 81 of the gate driving transistor 80 or stop migrating, so that the ultraviolet sensing transistor 60, the control transistor 70, and the gate driving transistor 80 are turned on or off.

In some embodiments, an area of the ultraviolet absorbing layer 61 of the ultraviolet sensing transistor 60 is greater than an area of the semiconductor layer 71 of the control transistor 70.

Specifically, the ultraviolet absorbing layer 61 of the ultraviolet sensing transistor needs a large enough area to absorb enough ultraviolet light, so that the sensitivity and precision of the display panel 100 in monitoring the ultraviolet light can be improved.

Specifically, since the control transistor 70 functions as a switching control and a driving control for the ultraviolet sensing transistor 60, the semiconductor layer 71 of the control transistor 70 may be provided to have a small area. As such, the occupation of the layout space by the control transistor 70 may be reduced, and the frame width of the display panel may be reduced.

In some embodiments, the ultraviolet absorbing layer 61 of the ultraviolet sensing transistor 60 has a channel width (W) ranging from 200 µm to 5000 µm, and a channel length (L) ranging from 3 µm to 6 µm. The semiconductor layer 71 of the control transistor 70 has a channel width (W) ranging from 3 µm to 20 µm, and a channel length (L) ranging from 3 µm to 6 µm.

Specifically, the ultraviolet absorbing layer 61 of the ultraviolet sensing transistor 60 has a channel width (W) ranging from 200 µm to 5000 µm, and a channel length (L) ranging from 3 µm to 6 µm, so that the ultraviolet absorbing layer 61 of the ultraviolet sensing transistor 60 has a sufficiently large area, which can absorb enough ultraviolet light, improve the sensitivity and precision of the display panel 100 in monitoring the ultraviolet light, and maintain a better on-off performance of the ultraviolet sensing transistor 60.

Specifically, the channel width is a width of a channel area 141, and the channel length is a length of the channel area 141.

In addition, the ultraviolet sensing transistor 60 has an on and off state. A voltage of the gate of the ultraviolet sensing transistor 60 can be adjusted to low the leakage current when the ultraviolet sensing transistor 60 is in the off state, thereby reducing the influence of the leakage current on the photo-generated current in the case of ultraviolet irradiating, reducing the noise and improving the precision on monitoring the ultraviolet light by the ultraviolet sensing transistor 60.

Embodiment 5

Figure 7:
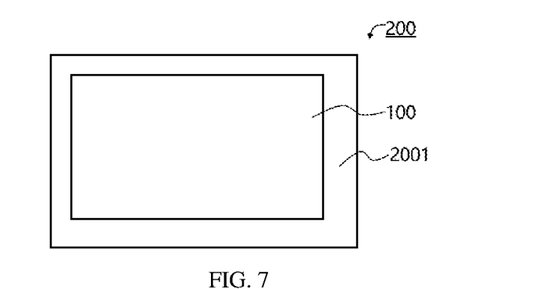
FIG. 7 is a schematic diagram of a display terminal according to an embodiment of the present disclosure.

FIG. 7 is a schematic diagram of a display terminal 200 according to an embodiment of the present disclosure.

An embodiment of the present disclosure provides a display terminal 200. The display terminal 200 includes a terminal body 2001 and a display panel 100 according to any one of the above embodiments. The terminal body 2001 and the display panel 100 are combined as a whole.

Specifically, the display terminal 200 may be a mobile phone, a notebook computer, or the like.

Embodiment 6

Figure 8:
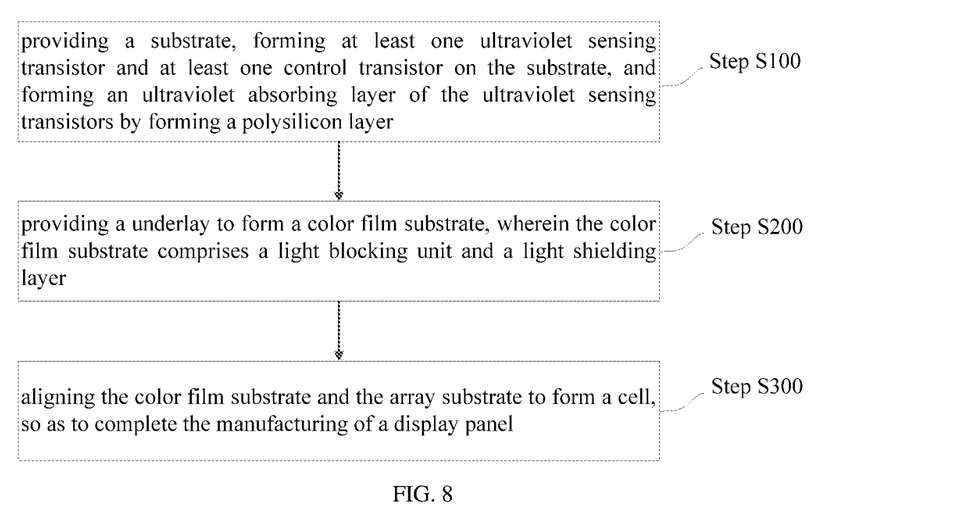
FIG. 8 is a first flow chart of a manufacturing method for a display panel according to an embodiment of the present disclosure.
Figure 9:
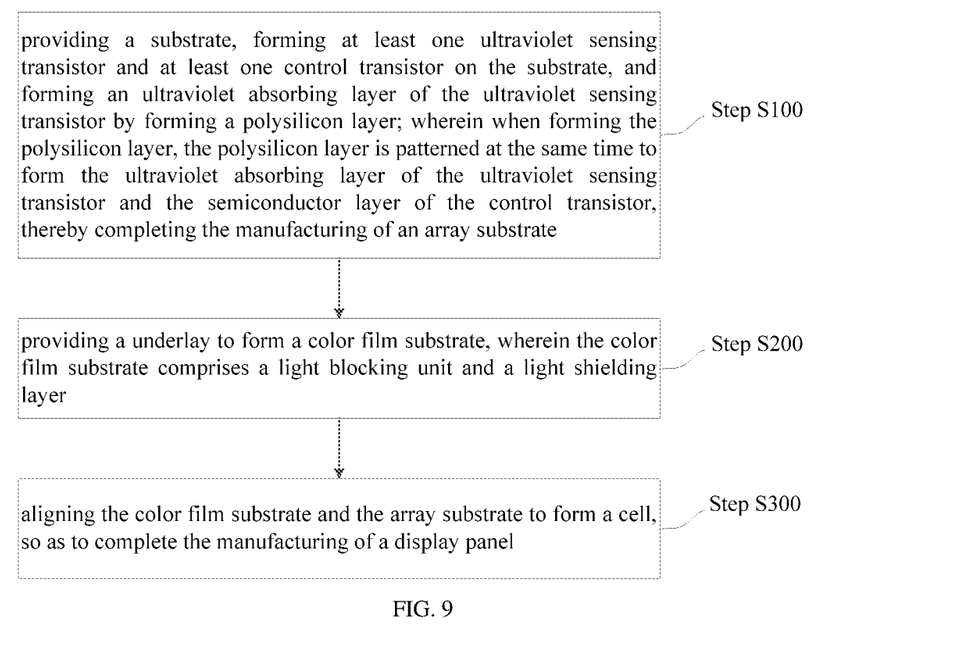
FIG. 9 is a second flow chart of a manufacturing method for a display panel according to an embodiment of the present disclosure.
Figure 10:
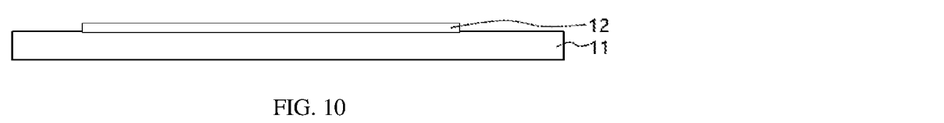
FIG. 10 is a first process diagram of a manufacturing method for a display panel according to an embodiment of the present disclosure.
Figure 11:
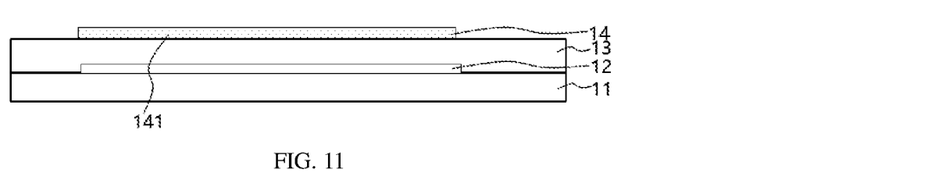
FIG. 11 is a second process diagram of a manufacturing method for a display panel according to an embodiment of the present disclosure.
Figure 12:
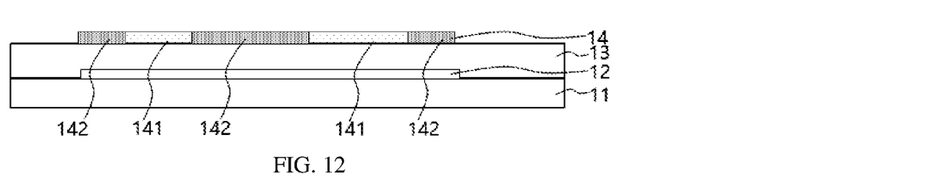
FIG. 12 is a third process diagram of a manufacturing method for a display panel according to an embodiment of the present disclosure.
Figure 13:
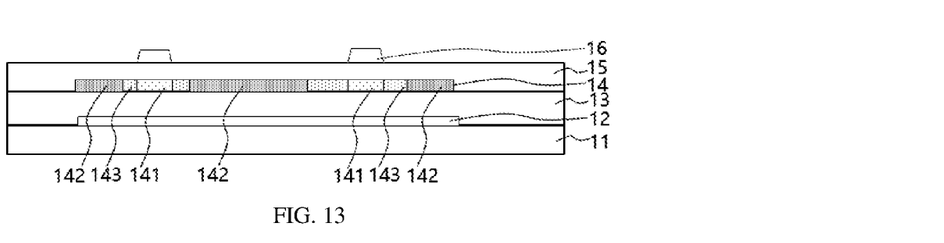
FIG. 13 is a fourth process diagram of a manufacturing method for a display panel according to an embodiment of the present disclosure.
Figure 14:
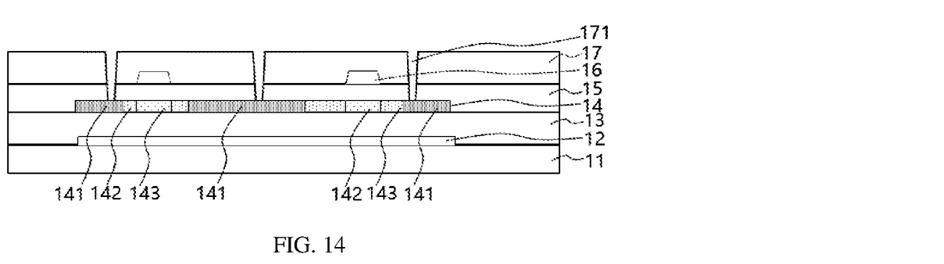
FIG. 14 is a fifth process diagram of a manufacturing method for a display panel according to an embodiment of the present disclosure.
Figure 15:
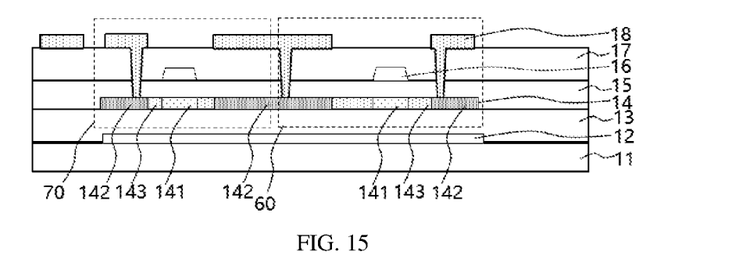
FIG. 15 is a sixth process diagram of a manufacturing method for a display panel according to an embodiment of the present disclosure.
Figure 16:
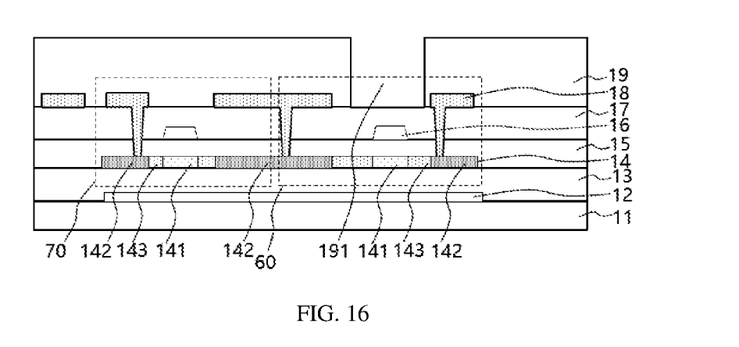
FIG. 16 is a seventh process diagram of a manufacturing method for a display panel according to an embodiment of the present disclosure.
Figure 17:
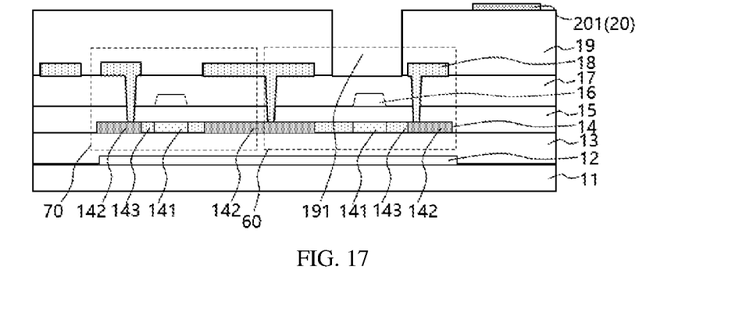
FIG. 17 is an eighth process diagram of a manufacturing method for a display panel according to an embodiment of the present disclosure.
Figure 18:
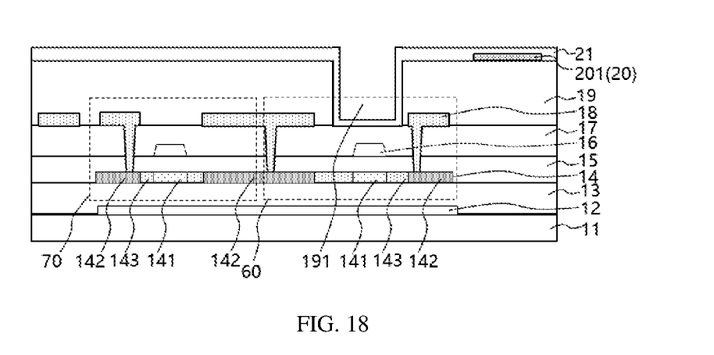
FIG. 18 is a schematic diagram of a ninth process of a manufacturing method for a display panel according to an embodiment of the present disclosure.
Figure 19:
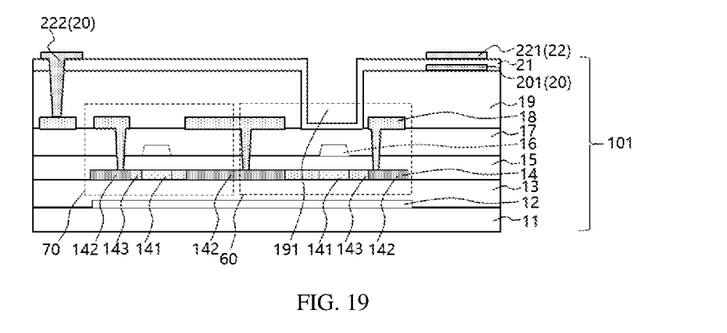
FIG. 19 is a tenth process diagram of a manufacturing method for a display panel according to an embodiment of the present disclosure.

References are made to FIG. 8 to FIG. 19, wherein FIG. 8 is a first flow chart of a manufacturing method for a display panel according to an embodiment of the present disclosure; FIG. 9 is a second flow chart of a manufacturing method for a display panel according to an embodiment of the present disclosure; FIG. 10 is a first process diagram of a manufacturing method for a display panel according to an embodiment of the present disclosure; FIG. 11 is a second process diagram of a manufacturing method for a display panel according to an embodiment of the present disclosure; FIG. 12 is a third process diagram of a manufacturing method for a display panel according to an embodiment of the present disclosure; FIG. 13 is a fourth process diagram of a manufacturing method for a display panel according to an embodiment of the present disclosure; FIG. 14 is a fifth process diagram of a manufacturing method for a display panel according to an embodiment of the present disclosure; FIG. 15 is a sixth process diagram of a manufacturing method for a display panel according to an embodiment of the present disclosure; FIG. 16 is a seventh process diagram of a manufacturing method for a display panel according to an embodiment of the present disclosure; FIG. 17 is an eighth process diagram of a manufacturing method for a display panel according to an embodiment of the present disclosure; FIG. 18 is a ninth process diagram of a manufacturing method for a display panel according to an embodiment of the present disclosure; and FIG. 19 is a tenth process diagram of a manufacturing method for a display panel according to an embodiment of the present disclosure.

An embodiment of the present disclosure provides a manufacturing method for a display panel. The display panel 100 according to any one of the above embodiments may be manufactured by the manufacturing method for the display panel according to the present embodiment.

Step S100: providing a substrate, forming at least one ultraviolet sensing transistor and at least one control transistor on the substrate, and forming an ultraviolet absorbing layer of each of the ultraviolet sensing transistors by forming a polysilicon layer.

Specifically, as shown in FIG. 10 to FIG. 15, a substrate 11 is provided on which at least one ultraviolet sensing transistor 60 and at least one control transistor 70 are formed, wherein the polysilicon layer 14 is formed, and the ultraviolet absorbing layer 61 of each of the ultraviolet sensing transistors 60 is formed by patterning the polysilicon layer 14.

Step S200: providing a underlay to form a color film substrate, wherein the color film substrate comprises a light blocking unit and a light shielding layer.

Specifically, the color film substrate 102 may include a underlay 26, a light shielding layer 25 disposed on the underlay 26, and a light blocking unit 240 disposed on the light shielding layer 25. The color film substrate 102 may further include a second flat layer 27 disposed on the light blocking unit 240.

Specifically, the structure and manufacturing process of the color film substrate 102 may be as same as or similar to the structure and manufacturing process of any color film substrate in the prior art, and details are not described herein again.

Step S300: aligning the color film substrate and the array substrate to form a cell, so as to complete the manufacturing of a display panel.

Specifically, a manufacturing process for aligning the color film substrate 102 and the array substrate 101 to form a cell may be as same as or similar to a manufacturing process for aligning these substrates to form a cell in the prior art, and details are not described herein again.

Referring to FIG. 9, step S100, step S200, and step S300 are further described below.

In some embodiments, in step S100, when forming the polysilicon layer, the polysilicon layer is patterned at the same time to form the ultraviolet absorbing layer of the ultraviolet sensing transistor and the semiconductor layer of the control transistor. As such, the array substrate is manufactured.

Specifically, as shown in FIG. 9, when forming the polysilicon layer 14 on the substrate 11, the polysilicon layer 14 is patterned at the same time to form the ultraviolet absorbing layer 61 of the ultraviolet sensing transistor 60 and the semiconductor layer 71 of the control transistor 70.

Specifically, the semiconductor layer 71 of the control transistor 70 and the ultraviolet absorbing layer 61 of the ultraviolet sensing transistor 60 are both made of polysilicon. The polysilicon is patterned to form the semiconductor layer 71 of the control transistor 70 and the ultraviolet absorbing layer 61 of the ultraviolet sensing transistor 60 at the same time, thereby simplifying the manufacturing processes and reducing the production cost.

In some embodiments, in the display panel 100 of step S300, the orthographic projection of the light blocking unit 240 on the substrate 11 at least partially overlaps the orthographic projection of the ultraviolet absorbing layer 61 on the substrate 11, or the orthographic projection of the light blocking unit 240 on the substrate 11 covers the orthographic projection of the ultraviolet absorbing layer 61 on the substrate 11.

In some embodiments, in the display panel 100 of step S300, the orthographic projection of the light shielding layer 25 on the substrate 11 covers the orthographic projection of the semiconductor layer 71 of the control transistor 70 on the substrate 11.

In some embodiments, the step S100 further includes forming a first flat layer 19 on a side of the ultraviolet absorbing layer 61 away from the substrate 11, wherein the first flat layer 19 includes a first sub-opening 191. In the display panel 100 of step S300, an orthographic projection of the first sub-opening 191 on the substrate 11 at least partially overlaps the orthographic projection of the ultraviolet absorbing layer 61 on the substrate 11.

Next, a detailed manufacturing process for the array substrate 101 is described by taking the array substrate 101 shown in FIG. 1 and FIG. 19 as an example. Referring to FIG. 10 to FIG. 19, the manufacturing process for the array substrate 101 includes steps S110, S120, S130, S140, S150, S160, S170, S180, S190, S210, and S220.

Step S110: as shown in FIG. 10, a substrate 11 is provided, wherein a blocking layer 12 is formed on the substrate 11.

Step S120, as shown in FIG. 11, a buffer layer 13 is formed on the blocking layer 12, and a polysilicon layer 14 is formed on the buffer layer 13.

Step S130: as shown in FIG. 12, a heavy doping process (N+ doping) is performed on the polysilicon layer 14 to form a heavy doping area 142. The heavy doping area 142 may include a source area and a drain area of the semiconductor layer 71 of the control transistor 70, and a source area and a drain area of the ultraviolet absorbing layer 61 of the ultraviolet sensing transistor 60.

Step S140: as shown in FIG. 13, a gate insulating layer 15 is formed on the polysilicon layer 14, and a gate layer 16 is formed on the gate insulating layer 15. The gate layer 16 includes a second gate 72 of the control transistor 70 and the ultraviolet absorbing layer 61 of the ultraviolet sensing transistor 60.

Step S150: as shown in FIG. 13, a light doping process (N-doping) is performed on the polysilicon layer 14 to form a light doping area 143. The light doping area 143 includes an area corresponding to the semiconductor layer 71 of the control transistor 70 and an area corresponding to the ultraviolet absorbing layer 61 of the ultraviolet sensing transistor 60.

Specifically, by the steps S120 to S150, the semiconductor layer 71 of the control transistor 70 and the ultraviolet absorbing layer 61 of the ultraviolet sensing transistor 60 are formed at the same time, and each of the semiconductor 71 and the ultraviolet absorbing layer 61 includes areas corresponding to the heavy doping area 142, the light doping area 143, and the channel area 141, respectively.

Step S160: as shown in FIG. 14, an interlayer insulating layer 17 is formed on the gate layer 16, and a via hole 171 is formed through the interlayer insulating layer 17.

Step S170: as shown in FIG. 15, a source/drain layer 18 is formed on the interlayer insulating layer 17. The source/drain layer includes a first source 621 and a first drain 622 of the ultraviolet sensing transistor 60, and a second source 721 and a second drain 722 of the control transistor 70.

Step S180: as shown in FIG. 16, a first flat layer 19 is formed on the source/drain layers 18, and a first sub-opening 191 is formed on the first flat layer 19.

Step S190: as shown in FIG. 17, a first metal layer 20 is formed on the first flat layer 19.

Specifically, the first metal layer 20 may be patterned to form a common electrode 201, wherein the first metal layer 20 may be made of indium tin oxide (ITO).

Step S210: as shown in FIG. 18, a first insulating layer 21 is formed on the first metal layer 20.

Step S220: as shown in FIG. 19, a second metal layer 22 is formed on the first insulating layer 21.

Specifically, the second metal layer 22 may be patterned to form a pixel electrode 221 or/and other electrodes 222, wherein the second metal layer 22 may be made of indium tin oxide (ITO).

According to the manufacturing steps S110-S220, the layer structure of the array substrate 101 shown in FIG. 1 to FIG. 18 sequentially includes: the substrate 11, the blocking layer 12, the buffer layer 13, the polysilicon layer 14, the gate insulating layer 15, the gate layer 16, the interlayer insulating layer 17, the source/drain layer 18, the first flat layer 19, the first metal layer 20, the first insulating layer 21, and the second metal layer 22.

In this embodiment, an ultraviolet sensing transistor is used as a component of an ultraviolet sensor, and a polysilicon is used as an ultraviolet absorbing layer. As such, the display panel can monitor the intensity of ultraviolet radiation, provide an early warning, and facilitate people to take protective measures. Meanwhile, by using the polysilicon as the ultraviolet absorbing layer and forming ultraviolet absorbing layer by the polysilicon via a mature process in the field of the display panel, the ultraviolet absorbing layer can be formed on the devices in the prior art, which has the advantages of simpler process and lower cost. In addition, the manufacturing of the components of the ultraviolet sensor according to the embodiment of the present disclosure is fully compatible with the production line of the low temperature polysilicon display panel, which improves the practicability of mass production and reduces the manufacturing cost.

Further, the polysilicon layer is patterned to form the ultraviolet absorbing layer 61 of the ultraviolet sensing transistor 60 and the semiconductor layer 71 of the control transistor 70 at the same time, which has the effect that the manufacturing process is simple without adding other additional processes.

It should be noted that the structure of the array substrate 101 of the display panel 100 according to Embodiments 1-5 is not limited to the structure of the array substrate 101 shown in FIG. 1 and FIG. 19. For example, the structure of the ultraviolet sensing transistor 60 and the control transistor 70 may be a top gate structure or a bottom gate structure, and is not limited herein.

A display panel and a display terminal provided in the embodiments of the present disclosure are described in detail above. The principles and implementation of the present disclosure are described herein by applying specific examples. The description of the above embodiments is only used to help understand the method and core idea of the present disclosure. At the same time, for those skilled in the art, according to the idea of the present disclosure, there will be some changes in specific embodiments and disclosure scope. In conclusion, the contents of the present specification shall not be construed as limiting the present disclosure.

What is claimed is:

1. A display panel, comprising:
an array substrate, wherein the array substrate comprises a substrate, and at least one ultraviolet sensing transistor and at least one control transistor disposed on the substrate, the control transistor is electrically connected with the ultraviolet sensing transistor, the ultraviolet sensing transistor comprises an ultraviolet absorbing layer, and the control transistor comprises a semiconductor layer;
a color film substrate disposed on an opposite side of the array substrate, wherein the color film substrate comprises a light blocking unit and a light shielding layer, an orthographic projection of the light blocking unit on the substrate covers an orthographic projection of the ultraviolet absorbing layer on the substrate, and an orthographic projection of the light shielding layer on the substrate covers an orthographic projection of the semiconductor layer on the substrate; and
a non-display area and a display area, wherein the ultraviolet sensing transistor and the control transistor are both disposed in the non-display area;
wherein the array substrate further comprises a blocking layer disposed between the substrate and the ultraviolet sensing transistor and the control transistor, and an orthographic projection of the blocking layer on the substrate covers both the orthographic projection of the ultraviolet absorbing layer on the substrate and the orthographic projection of the semiconductor layer on the substrate.

2. The display panel of claim 1, wherein the color film substrate further comprises a first color resistance, a second color resistance, and a third color resistance;
wherein the light blocking unit comprises one of the first color resistance, the second color resistance, and the third color resistance, or the light blocking unit comprises at least two of the first color resistance, the second color resistance, and the third color resistance which are stacked.

3. The display panel of claim 2, wherein the light shielding layer comprises a black matrix.

4. The display panel of claim 1, wherein the ultraviolet sensing transistor further comprises a first gate, a first source, and a first drain, and the control transistor further comprises a second gate, a second source, and a second drain;
wherein the first gate and the second gate are located in a same layer, the first source, the first drain, the second source and the second drain are located in a same layer, and the ultraviolet absorbing layer of the ultraviolet sensing transistor and a semiconductor layer of the control transistor are located in a same layer.

5. The display panel of claim 4, wherein the display panel further comprises a gate driving circuit disposed in the non-display area, the gate driving circuit comprises a plurality of gate driving transistors, and each of the plurality of gate driving transistors comprises a third gate, a third source, a third drain, and an active layer;
wherein the first gate and the third gate are located in a same layer, the first source, the first drain, the third source and the third drain are located in a same layer, and the ultraviolet absorbing layer of the ultraviolet sensing transistor and the active layer of the gate driving transistor are located in a same layer.

6. The display panel of claim 5, wherein the ultraviolet absorbing layer of the ultraviolet sensing transistor, the semiconductor layer of the control transistor, and the active layer of the gate driving transistor are made of polysilicon.

7. The display panel of claim 4, wherein an area of the ultraviolet absorbing layer of the ultraviolet sensing transistor is larger than an area of the semiconductor layer of the control transistor.

8. The display panel of claim 7, wherein the ultraviolet absorbing layer of the ultraviolet sensing transistor has a channel width ranging from 200 μm to 5000 μm, and a channel length ranging from 3 μm to 6 μm;
  wherein the semiconductor layer of the control transistor has a channel width ranging from 3 μm to 20 μm, and a channel length ranging from 3 μm to 6 μm.

9. A display terminal, comprising a terminal body and a display panel, wherein the terminal body and the display panel are integrated, and the display panel comprises:
  an array substrate, wherein the array substrate comprises a substrate, and at least one ultraviolet sensing transistor and at least one control transistor disposed on the substrate, the control transistor is electrically connected with the ultraviolet sensing transistor, the ultraviolet sensing transistor comprises an ultraviolet absorbing layer, and the control transistor comprises a semiconductor layer;
  a color film substrate disposed on an opposite side of the array substrate, wherein the color film substrate comprises a light blocking unit and a light shielding layer, an orthographic projection of the light blocking unit on the substrate covers an orthographic projection of the ultraviolet absorbing layer on the substrate, and an orthographic projection of the light shielding layer on the substrate covers an orthographic projection of the semiconductor layer on the substrate; and
  a non-display area and a display area, wherein the ultraviolet sensing transistor and the control transistor are both disposed in the non-display area;
  wherein the array substrate further comprises a blocking layer disposed between the substrate and the ultraviolet sensing transistor and the control transistor, and an orthographic projection of the blocking layer on the substrate covers both the orthographic projection of the ultraviolet absorbing layer on the substrate and the orthographic projection of the semiconductor layer on the substrate.

10. The display terminal of claim 9, wherein the color film substrate further comprises a first color resistance, a second color resistance, and a third color resistance;
  wherein the light blocking unit comprises one of the first color resistance, the second color resistance, and the third color resistance, or the light blocking unit comprises at least two of the first color resistance, the second color resistance, and the third color resistance which are stacked.

11. The display terminal of claim 10, wherein the light shielding layer comprises a black matrix.

12. The display terminal of claim 9, wherein the ultraviolet sensing transistor further comprises a first gate, a first source, and a first drain, and the control transistor further comprises a second gate, a second source, and a second drain;
  wherein the first gate and the second gate are located in a same layer, the first source, the first drain, the second source and the second drain are located in a same layer, and the ultraviolet absorbing layer of the ultraviolet sensing transistor and a semiconductor layer of the control transistor are located in a same layer.

13. The display panel of claim 1, wherein the array substrate further comprises a first organic layer between the light blocking unit and the ultraviolet absorbing layer, the first organic layer comprises a first opening, and an orthographic projection of the first opening of the first organic layer on the substrate at least partially overlaps the orthographic projection of the ultraviolet absorbing layer on the substrate.

14. The display terminal of claim 9, wherein the array substrate of the display panel further comprises a first organic layer between the light blocking unit and the ultraviolet absorbing layer, the first organic layer comprises a first opening, and an orthographic projection of the first opening of the first organic layer on the substrate at least partially overlaps the orthographic projection of the ultraviolet absorbing layer on the substrate.

\* \* \* \* \*